(12) United States Patent
Shwartz et al.

(10) Patent No.: US 11,681,928 B2
(45) Date of Patent: Jun. 20, 2023

(54) REFINEMENT OF A PREDICTED EVENT BASED ON EXPLAINABILITY DATA

(71) Applicant: International Business Machines Corporation, Armonk, NY (US)

(72) Inventors: Larisa Shwartz, Greenwich, CT (US); Frank Bagehorn, Dottikon (CH); Jinho Hwang, Ossining, NY (US); Marcos Vinicius L. Paraiso, Campinas (BR); Rafal Bigaj, Cracow (PL); Vidhya Shankar Venkatesan, Bangalore (IN); Dorothea Wiesmann Rothuizen, Oberrieden (CH); Amol Bhaskar Mahamuni, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1018 days.

(21) Appl. No.: 16/269,125

(22) Filed: Feb. 6, 2019

(65) Prior Publication Data
US 2020/0250548 A1 Aug. 6, 2020

(51) Int. Cl.
G06F 9/54 (2006.01)
G06N 5/022 (2023.01)
G06F 11/07 (2006.01)

(52) U.S. Cl.
CPC ............ *G06N 5/022* (2013.01); *G06F 9/542* (2013.01); *G06F 11/0793* (2013.01)

(58) Field of Classification Search
None
See application file for complete search history.

(56) References Cited

U.S. PATENT DOCUMENTS

| 7,389,288 | B2 | 6/2008 | Chickering et al. |
| 10,574,512 | B1* | 2/2020 | Mermoud ............ H04L 41/5019 |
| 2018/0218272 | A1 | 8/2018 | Manikonda et al. |
| 2018/0322406 | A1 | 11/2018 | Merrill et al. |
| 2019/0188588 | A1* | 6/2019 | Yang .................... G06K 9/6231 |

OTHER PUBLICATIONS

Marcoter/ Lime, https://github.com/marcotcr/lime, Last accessed Jan. 30, 2019, 7 pages.
Lundberg, et al, A Unified Approach to Interpreting Model Predictions, 31st Conference on Neural Information Processing Systems, Nov. 25, 2017, 10 pages.

(Continued)

*Primary Examiner* — Syed A Roni
(74) *Attorney, Agent, or Firm* — Amin, Turocy & Watson, LLP

(57) ABSTRACT

Systems, computer-implemented methods, and computer program products that can facilitate refinement of a predicted event based on explainability data are provided. According to an embodiment, a system can comprise a memory that stores computer executable components and a processor that executes the computer executable components stored in the memory. The computer executable components can comprise an interpreter component that identifies a probable cause of a predicted event based on explainability data. The computer executable components can further comprise an enrichment component that executes a diagnostic analysis based on the probable cause.

14 Claims, 13 Drawing Sheets

(56) References Cited

OTHER PUBLICATIONS

Abdollahi, et al., Transparency in Fair Machine Learning: The Case of Explainable Recommender Systems, Human and Machine Learning, Jun. 18, 2018.

Mel, et al., The NIST Definition of Cloud Computing, National Institute of Standards and Technology Special Publication 800-145, Sep. 2011, 7 Pages.

What-If Tool, https://pair-code.github.io/what-if-tool/, Last accessed Feb. 2, 2019, 4 Pages.

* cited by examiner

REFINEMENT OF A PREDICTED EVENT BASED ON EXPLAINABILITY DATA

BACKGROUND

The subject disclosure relates to event prediction models and cognitive automation systems, and more specifically, to automated refinement of a predicted event based on explainability data.

Artificial intelligence (AI) models and machine learning (ML) models today have found their way into all aspects of scientific explorations. Their adoption into main stream of business continues to be a challenge. Experts have found that industry deployments of machine learning capabilities are below expectations. Explainability data corresponding to AI or ML model results is a critical element that provides a user with predictions in interpretable and consistent manner A problem with current explainability data corresponding to AI or ML model results is that it targets a human actor with an assumption that AI or ML model findings are only consumable (e.g., utilized) by a person. At the same time, the information technology (IT) industry, for example, is actively pursuing cognitive automated actions.

In addition, explainability data corresponding to outcomes from blackbox deep learning models for images, text, and tabular data is being widely researched. However, there are limited solutions available for classification models trained on time series data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, or computer program products that can facilitate refinement of a predicted event based on explainability data are described.

According to an embodiment, a system can comprise a memory that stores computer executable components and a processor that executes the computer executable components stored in the memory. The computer executable components can comprise an interpreter component that identifies a probable cause of a predicted event based on explainability data. The computer executable components can further comprise an enrichment component that executes a diagnostic analysis based on the probable cause. An advantage of such a system is that it can automatically (e.g., without action by a human user) enrich the explainability data based on diagnostics data determined by executing the diagnostic analysis.

In some embodiments, the computer executable components can further comprise a recommender component that recommends a remediation action based on at least one of the predicted event, the explainability data, the probable cause, the diagnostic analysis, or domain data. An advantage of such a system is that it can automatically (e.g., without action by a human user) recommend such a remediation action to remediate or resolve the predicted event.

According to another embodiment, a computer-implemented method can comprise identifying, by a system operatively coupled to a processor, a probable cause of a predicted event based on explainability data. The computer-implemented method can further comprise executing, by the system, a diagnostic analysis based on the probable cause. An advantage of such a computer-implemented method is that it can be implemented to automatically (e.g., without action by a human user) enrich the explainability data based on diagnostics data determined by executing the diagnostic analysis.

In some embodiments, the computer-implemented method can further comprise recommending, by the system, a remediation action based on at least one of the predicted event, the explainability data, the probable cause, the diagnostic analysis, or domain data. An advantage of such a computer-implemented method is that it can be implemented to automatically (e.g., without action by a human user) recommend such a remediation action to remediate or resolve the predicted event.

According to another embodiment, a computer program product facilitating a predicted event refinement process based on explainability data is provided. The computer program product comprising a computer readable storage medium having program instructions embodied therewith, the program instructions executable by a processor to cause the processor to identify, by the processor, a probable cause of a predicted event based on explainability data. The program instructions are further executable by the processor to cause the processor to execute, by the processor, a diagnostic analysis based on the probable cause. An advantage of such a computer program product is that it can automatically (e.g., without action by a human user) enrich the explainability data based on diagnostics data determined by executing the diagnostic analysis.

In some embodiments, the program instructions are further executable by the processor to cause the processor to recommend, by the processor, a remediation action based on at least one of the predicted event, the explainability data, the probable cause, the diagnostic analysis, or domain data. An advantage of such a computer program product is that it can automatically (e.g., without action by a human user) recommend such a remediation action to remediate or resolve the predicted event.

According to an embodiment, a system can comprise a memory that stores computer executable components and a processor that executes the computer executable components stored in the memory. The computer executable components can comprise an explanation component that generates explainability data corresponding to a predicted event. The computer executable components can further comprise an automation engine component that evaluates accuracy of the predicted event based on the explainability data and supplemental data. An advantage of such a system is that it can automatically (e.g., without action by a human user) evaluate the probability that the predicted event will occur based on the explainability data and the supplemental data.

In some embodiments, the automation engine component validates or refines the predicted event based on the supplemental data. An advantage of such a system is that it can automatically (e.g., without action by a human user) validate the probability that the predicted event will occur or refine (e.g., enrich) the predicted event based on the supplemental data.

According to another embodiment, a computer-implemented method can comprise generating, by a system operatively coupled to a processor, explainability data corresponding to a predicted event. The computer-implemented method can further comprise evaluating, by the system, accuracy of the predicted event based on the explainability data and supplemental data. An advantage of such a computer-implemented method is that it can be implemented to automatically (e.g., without action by a human user) evaluate the probability that the predicted event will occur based on the explainability data and the supplemental data.

In some embodiments, the computer-implemented method can further comprise validating or refining, by the system, the predicted event based on the supplemental data. An advantage of such a computer-implemented method is that it can be implemented to automatically (e.g., without action by a human user) validate the probability that the predicted event will occur or refine (e.g., enrich) the predicted event based on the supplemental data.

DETAILED DESCRIPTION

Figure 1:
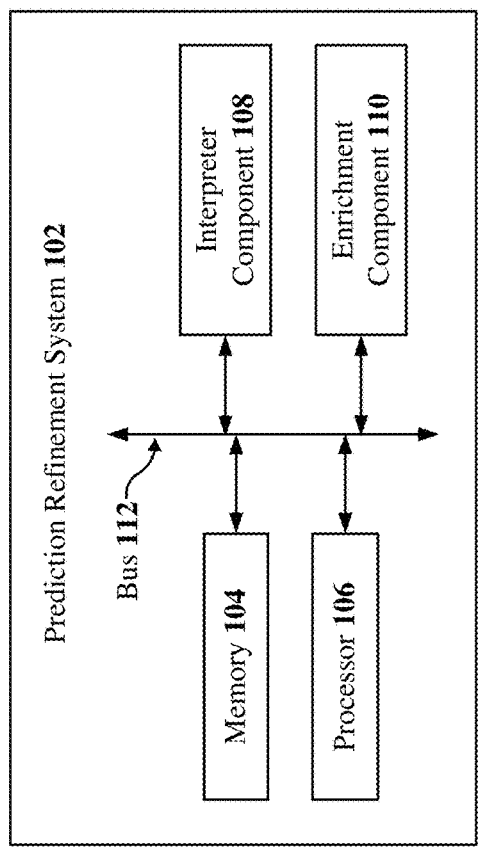
FIG. 1 illustrates a block diagram of an example, non-limiting system that can facilitate refinement of a predicted event based on explainability data in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Given the above problem with current explainability data targeting a human actor with an assumption that AI or ML model findings are only consumable (e.g., utilized) by a person, the present disclosure can be implemented to produce a solution to this problem in the form of systems, computer-implemented methods, or computer program products that can identify a probable cause of a predicted event based on explainability data or execute a diagnostic analysis based on the probable cause. An advantage of such systems, computer-implemented methods, or computer program products is that they can automatically (e.g., without action by a human user) enrich the explainability data based on diagnostics data determined by executing the diagnostic analysis.

In some embodiments, the present disclosure can be implemented to produce a solution to the problem described above in the form of systems, computer-implemented methods, or computer program products that can recommend a remediation action based on at least one of the predicted event, the explainability data, the probable cause, the diagnostic analysis, or domain data. An advantage of such systems, computer-implemented methods, or computer program products is that they can automatically (e.g., without action by a human user) recommend such a remediation action to remediate or resolve the predicted event.

Furthermore, given the above problem with current explainability data targeting a human actor with an assumption that AI or ML model findings are only consumable (e.g., utilized) by a person, the present disclosure can be implemented to produce a solution to this problem in the form of systems, computer-implemented methods, or computer program products that can generate explainability data corresponding to a predicted event or evaluate accuracy of the predicted event based on the explainability data and supplemental data. An advantage of such systems, computer-implemented methods, or computer program products is that they can automatically (e.g., without action by a human user) evaluate the probability that the predicted event will occur based on the explainability data and the supplemental data.

In some embodiments, the present disclosure can be implemented to produce a solution to the problem described above in the form of systems, computer-implemented methods, or computer program products that can validate or refine the predicted event based on the supplemental data. An advantage of such systems, computer-implemented methods, or computer program products is that they can automatically (e.g., without action by a human user) validate the probability that the predicted event will occur or refine (e.g., enrich) the predicted event based on the supplemental data.

FIG. 1 illustrates a block diagram of an example, non-limiting system 100 that can facilitate refinement of a predicted event based on explainability data in accordance with one or more embodiments described herein. In some embodiments, system 100 can comprise a prediction refinement system 102, which can be associated with or implemented in a cloud computing environment. For example, prediction refinement system 102 can be associated with or implemented in cloud computing environment 1150 described below with reference to FIG. 11 or one or more functional abstraction layers described below with reference to FIG. 12 (e.g., hardware and software layer 1260, virtualization layer 1270, management layer 1280, or workloads layer 1290).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, system 100 can comprise a prediction refinement system 102. In some embodiments, prediction refinement system 102 can comprise a memory 104, a processor 106, an interpreter component 108, an enrichment component 110, or a bus 112.

It should be appreciated that the embodiments of the subject disclosure depicted in various figures disclosed herein are for illustration only, and as such, the architecture of such embodiments are not limited to the systems, devices, or components depicted therein. For example, in some embodiments, system 100 or prediction refinement system 102 can further comprise various computer or computing-based elements described herein with reference to operating environment 1000 and FIG. 10. In several embodiments, such computer or computing-based elements can be used in connection with implementing one or more of the systems, devices, components, or computer-implemented operations shown and described in connection with FIG. 1 or other figures disclosed herein.

According to multiple embodiments, memory 104 can store one or more computer or machine readable, writable, or executable components or instructions that, when executed by processor 106, can facilitate performance of operations defined by the executable component(s) or instruction(s). For example, memory 104 can store computer or machine readable, writable, or executable components or instructions that, when executed by processor 106, can facilitate execution of the various functions described herein relating to prediction refinement system 102, interpreter component 108, enrichment component 110, or another component associated with prediction refinement system 102, as described herein with or without reference to the various figures of the subject disclosure.

In some embodiments, memory 104 can comprise volatile memory (e.g., random access memory (RAM), static RAM (SRAM), dynamic RAM (DRAM), etc.) or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors or electronic circuitry that can implement one or more computer or machine readable, writable, or executable components or instructions that can be stored on memory 104. For example, processor 106 can perform various operations that can be specified by such computer or machine readable, writable, or executable components or instructions including, but not limited to, logic, control, input/output (I/O), arithmetic, or the like. In some embodiments, processor 106 can comprise one or more central processing unit, multi-core processor, microprocessor, dual microprocessors, microcontroller, System on a Chip (SOC), array processor, vector processor, or another type of processor. Further examples of processor 106 are described below with reference to processing unit 1014 and FIG. 10. Such examples of processor 106 can be employed to implement any embodiments of the subject disclosure.

In some embodiments, prediction refinement system 102, memory 104, processor 106, interpreter component 108, enrichment component 110, or another component of prediction refinement system 102 as described herein can be communicatively, electrically, or operatively coupled to one another via a bus 112 to perform functions of system 100, prediction refinement system 102, or any components coupled therewith. In several embodiments, bus 112 can comprise one or more memory bus, memory controller, peripheral bus, external bus, local bus, or another type of bus that can employ various bus architectures. Further examples of bus 112 are described below with reference to system bus 1018 and FIG. 10. Such examples of bus 112 can be employed to implement any embodiments of the subject disclosure.

In some embodiments, prediction refinement system 102 can comprise any type of component, machine, device, facility, apparatus, or instrument that comprises a processor or can be capable of effective or operative communication with a wired or wireless network. All such embodiments are envisioned. For example, prediction refinement system 102 can comprise a server device, a computing device, a general-purpose computer, a special-purpose computer, a tablet computing device, a handheld device, a server class computing machine or database, a laptop computer, a notebook computer, a desktop computer, a cell phone, a smart phone, a consumer appliance or instrumentation, an industrial or commercial device, a digital assistant, a multimedia Internet enabled phone, a multimedia players, or another type of device.

In some embodiments, prediction refinement system 102 can be coupled (e.g., communicatively, electrically, operatively, etc.) to one or more external systems, sources, or devices (e.g., computing devices, communication devices, etc.) via a data cable (e.g., High-Definition Multimedia Interface (HDMI), recommended standard (RS) 232, Ethernet cable, etc.). In some embodiments, prediction refinement system 102 can be coupled (e.g., communicatively, electrically, operatively, etc.) to one or more external systems, sources, or devices (e.g., computing devices, communication devices, etc.) via a network.

According to multiple embodiments, such a network can comprise wired and wireless networks, including, but not limited to, a cellular network, a wide area network (WAN) (e.g., the Internet) or a local area network (LAN). For example, prediction refinement system 102 can communicate with one or more external systems, sources, or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, or other proprietary and non-proprietary communication protocols. In such an example, prediction refinement system 102 can thus include hardware (e.g., a central processing unit (CPU), a transceiver, a decoder), software (e.g., a set of threads, a set of processes, software in execution) or a combination of hardware and software that facilitates communicating information between prediction refinement system 102 and external systems, sources, or devices (e.g., computing devices, communication devices, etc.).

According to multiple embodiments, prediction refinement system 102 can comprise one or more computer or machine readable, writable, or executable components or instructions that, when executed by processor 106, can facilitate performance of operations defined by such component(s) or instruction(s). Further, in numerous embodiments, any component associated with prediction refinement system 102, as described herein with or without reference to the various figures of the subject disclosure, can comprise one or more computer or machine readable, writable, or executable components or instructions that, when executed by processor 106, can facilitate performance of operations defined by such component(s) or instruction(s). For example, interpreter component 108, enrichment component 110, or any other components associated with prediction refinement system 102 as disclosed herein (e.g., communicatively, electronically, or operatively coupled with or employed by prediction refinement system 102), can comprise such computer or machine readable, writable, or executable component(s) or instruction(s). Consequently, according to numerous embodiments, prediction refinement system 102 or any components associated therewith as disclosed herein, can employ processor 106 to execute such computer or machine readable, writable, or executable component(s) or instruction(s) to facilitate performance of one or more operations described herein with reference to prediction refinement system 102 or any such components associated therewith.

In some embodiments, to implement one or more prediction event refinement operations, prediction refinement system 102 can facilitate performance of operations executed by or associated with interpreter component 108, enrichment component 110, or another component associated with prediction refinement system 102 as disclosed herein. For example, as described in detail below, prediction refinement system 102 can facilitate: identifying a probable cause of a predicted event based on explainability data; executing a diagnostic analysis based on the probable cause; identifying at least one of an event type corresponding to the explainability data or correlating events corresponding to the explainability data, where the explainability data comprises probability of the predicted event, a feature contributing to the predicted event, a weight of the feature contributing to the predicted event, or timing of the predicted event; validating the predicted event based on the diagnostic analysis or domain data; recommending a remediation action based the predicted event, the explainability data, the probable cause, the diagnostic analysis, or the domain data; or refining the predicted event or the remediation action based on a correlation between the predicted event and occurrence of the predicted event.

According to multiple embodiments, interpreter component 108 can identify one or more probable causes of a predicted event based on explainability data. For example, interpreter component 108 can identify one or more probable causes of a predicted event (also referred to herein as an anomaly) such as, for instance, an outage event of a computing device (e.g., a server), an electric grid overload, an extreme performance degradation of an application, an automotive vehicle critical issue, an incident in or disruption of a production line or supply line, or another predicted event. In this example, such a predicted event can be generated by an artificial intelligence (AI) model or a machine learning model (e.g., a classification model, a probabilistic model, statistical-based model, an inference-based model, a deep learning model, a neural network, fuzzy logic, expert system, Bayesian model, etc.).

In some embodiments, interpreter component 108 can identify one or more probable causes of a predicted event based on explainability data, where such explainability data can include, but is not limited to, probability of the predicted event (e.g., probability of occurrence), a feature contributing to the predicted event (also referred to herein as a feature), a weight of the feature contributing to the predicted event (also referred to herein as a feature weight), timing of the predicted event, or other explainability data. In some embodiments, interpreter component 108 can identify one or more probable causes of a predicted event, where such one or more probable causes can include, but are not limited to, an event type corresponding to the explainability data, correlating events corresponding to the explainability data, or another probable cause. In some embodiments, such probable causes (e.g., event types, correlating events, etc.) that can be identified by interpreter component 108 can enrich the predicted event (e.g., the predicted event data) or the explainability data corresponding to the predicted event.

In some embodiments, to facilitate identifying one or more probable causes of a predicted event based on explainability data, interpreter component 108 can map one or more features from explainability data to event types. For example, interpreter component 108 can map (e.g., via a mapping algorithm) one or more features from explainability data to event types based on best practices (e.g., best practices of an industry, an entity, a company, etc.). As referenced herein, best practices are commercial or professional procedures that are accepted or prescribed as being correct or most effective. In some embodiments, monitoring best practices define monitoring objects naming convention, Hostnames, Keywords, Owner Identifications (IDs), Message IDs, etc., which can be used for classification of monitoring events. In some embodiments, monitoring best practices can be used to classify a predicted event. In some embodiments, best practices can define groups of events from a single system or multiple systems which could correlate. In these embodiments, knowledge about this grouping allows extension (e.g., via interpreter component 108) of a predicted event to a group of correlated events or potentially multiple groups that could correspond to the predicted event.

In some embodiments, interpreter component 108 can map (e.g., via a mapping algorithm) one or more features (e.g., central processor unit (CPU) usage, etc.) from explainability data to event types (e.g., CPU outage, Memory Utilization for specific processes, swap space usage, database inactive, database background Dump Percent, etc.). In some embodiments, interpreter component 108 can perform such mapping as a classification into event class or event type. For example, interpreter component 108 can classify a feature "disk_xxxx_max" into "all_dsp_xxx_exc" based on all metrics collected from a specific system. In some embodiments, interpreter component 108 can perform such mapping operations described here at the time of event prediction or at some other time (e.g., at the time of training and modeling such an artificial intelligence (AI) or machine learning model described above.

In some embodiments, based on mapping such one or more features from explainability data to event types as described above, interpreter component 108 can identify correlating events. In some embodiments, such correlating events can be identified at the time of training (e.g., training of an artificial intelligence (AI) or machine learning model). In some embodiments, historical data (e.g., events and tickets) can be processed using, for example, multivariate spatiotemporal clustering, for instance, using events or tickets times and their location. In these embodiments, such location can be interpreted as a single system (e.g., with or without a full stack) or a group of systems or servers that support the same business workload. In one example, based on the mapping operation described above, interpreter component 108 can identify a correlation between event types such as, for instance, an increase in CPU usage and CPU outage, an increase in CPU usage and poor performance of an application executed by such CPU, a group containing events such as, for instance, 'unsuccessful ping', 'backup failure', or 'client inactive', a group of 'database inactive', 'connection issue', or 'workload failure' or other correlating events. In some embodiments, an increase in CPU usage, for example, can constitute a probable cause of a predicted outage event of the CPU.

According to multiple embodiments, enrichment component 110 can identify one or more diagnostic analyses (e.g., system ping, database call, application or workload performance probe, disk space assessment, etc.) that can be executed on an endpoint device based on one or more probable causes of a predicted event. For example, enrichment component 110 can identify one or more diagnostic analyses, that can be executed on an endpoint device (e.g., a server, the CPU described above, etc.) based on the one or more probable causes of a predicted event that can be identified by interpreter component 108 as described above. In an embodiment, enrichment component 110 can employ a multi-armed bandit to recommend a set of actions to troubleshoot (e.g., diagnostics) over historical event and ticket data. In this embodiment, such diagnostics can succeed or fail on the same machine (e.g., endpoint device, computing device, etc.). In some embodiments, where diagnostics can be considered dependent and arms of the multi-armed bandit can be considered independent, employing such a multi-armed bandit can enforce hierarchical taxonomy on the arms or actions. In some embodiments, prediction refinement system 102 and/or enrichment component 202 can continuously recommend the appropriate diagnostics corresponding to an in-coming event and adapt the up-to-date feedback to improve the goodness of matching between the tickets and automated diagnostics in information technology (IT) services.

In some embodiments, enrichment component 110 can execute one or more diagnostic analyses based on one or more probable causes of a predicted event. For example, enrichment component 110 can execute the one or more diagnostic analyses identified by enrichment component 110 as described above. In some embodiments, enrichment component 110 can execute the one or more diagnostic analyses to obtain additional data. For example, enrichment component 110 can execute the one or more diagnostic analyses to obtain additional data including, but not limited to, diagnostics data (e.g., performance data, metrics, 'ping not returned', 'network packets dropped', 'system disk utilization 87%', etc.), domain data (e.g., time series data, known thresholds for a system, critical symptoms of known root causes, etc.) or other additional data. In this example, such additional data obtained by enrichment component 110 executing such one or more diagnostic analyses can enrich the predicted event (e.g., the predicted event data) or the explainability data corresponding to the predicted event.

In some embodiments, based on the explainability data, the probable cause(s), the event type(s), the correlating events, the diagnostics data, or the domain data described above, prediction refinement system 102 can facilitate validation of a predicted event, recommendation of a remediation action, or refinement of a predicted event. For example, prediction refinement system 102 can facilitate such validation, recommendation, or refinement operations by employing recommender component 202 or refinement component 204 as described below with reference to FIG. 2.

Figure 2:
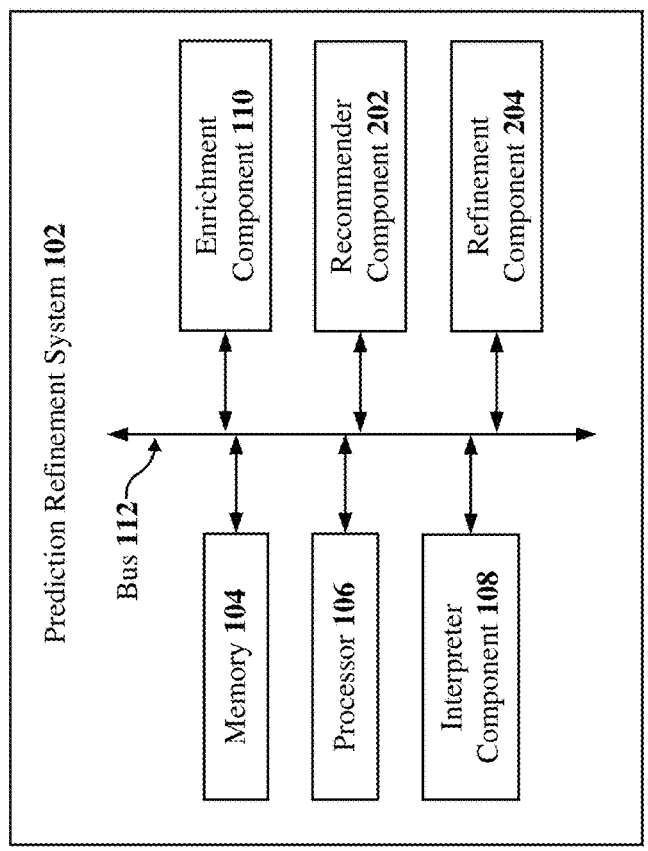
FIG. 2 illustrates a block diagram of an example, non-limiting system that can facilitate refinement of a predicted event based on explainability data in accordance with one or more embodiments described herein.

FIG. 2 illustrates a block diagram of an example, non-limiting system 200 that can facilitate refinement of a predicted event based on explainability data in accordance with one or more embodiments described herein. In some embodiments, system 200 can comprise prediction refinement system 102. In some embodiments, prediction refinement system 102 can comprise a recommender component 202 or a refinement component 204. Repetitive description of like elements or processes employed in respective embodiments is omitted for sake of brevity.

According to multiple embodiments, recommender component 202 can validate a predicted event. For example, recommender component 202 can validate a risk associated with a predicted event or a probability of occurrence of a predicted event. In some embodiments, recommender component 202 can validate a predicted event based on a diagnostic analysis or domain data. For instance, recommender component 202 can validate a predicted event based on diagnostics data (e.g., performance data, metrics, etc.) or domain data (e.g., time series data, etc.) obtained from a diagnostic analysis that can be executed by enrichment component 110 as described above with reference to FIG. 1.

In some embodiments, recommender component 202 can recommend one or more remediation actions to remediate or resolve a predicted event. For example, recommender component 202 can recommend one or more remediation actions based on a predicted event or explainability data corresponding to the predicted event. For instance, recommender component 202 can recommend a remediation action based on the one or more probable causes, the diagnostic analysis (e.g., diagnostics data), or the domain data that can be determined by interpreter component 108 or enrichment component 110 as described above with reference to FIG. 1. In some embodiments, recommender component 202 can recommend a remediation action based on a predicted event that has been validated by recommender component 202 as described above. In some embodiments, recommender component 202 can recommend one or more remediation actions including, but not limited to starting missing processes (e.g., in required order), clearing temporary spaces, temporary removing or ending non-critical processes, or another remediation action.

In some embodiments, to facilitate such recommendation of a remediation action, recommender component 202 can comprise a machine learning model or an artificial intelligence (AI) model that can be trained (e.g., via explicit learning or implicit learning) to recommend a remediation action. In some embodiments, recommender component 202 can comprise such a machine learning model or an artificial intelligence (AI) model that can be trained to recommend a remediation action based on a predicted event or explainability data corresponding to the predicted event. In some embodiments, recommender component 202 can comprise such a machine learning model or an artificial intelligence (AI) model that can be trained to recommend a remediation action based on the one or more probable causes (e.g., event types, correlating events, etc.), the diagnostic analysis (e.g., diagnostics data), or the domain data that can be determined by interpreter component 108 or enrichment component 110 as described above with reference to FIG. 1. In some embodiments, recommender component 202 can comprise such a machine learning model or an artificial intelligence (AI) model that can be trained to recommend a remediation action based on a predicted event that has been validated by recommender component 202 as described above.

According to multiple embodiments, refinement component 204 can refine a predicted event or a remediation action based on a correlation between the predicted event and occurrence of the predicted event. For example, refinement component 204 can monitor a network (e.g., the Internet, an intranet network, a database, etc.) to determine whether a predicted event occurs. In this example, based on whether the predicted event occurs, refinement component 204 can refine a predicted event or a remediation action. For instance, in some embodiments where an originally predicted event does not occur, refinement component 204 can refine a subsequent event prediction or a remediation action corresponding to such a subsequent event prediction based on the nonoccurrence of the originally predicted event. In this example, based on the nonoccurrence of the originally predicted event, refinement component 204 can, for instance, reduce a probability of occurrence associated with the subsequently predicted event or cancel a remediation action corresponding to such a subsequently predicted event based on the reduced probability of occurrence associated with the subsequently predicted event.

Figure 3:
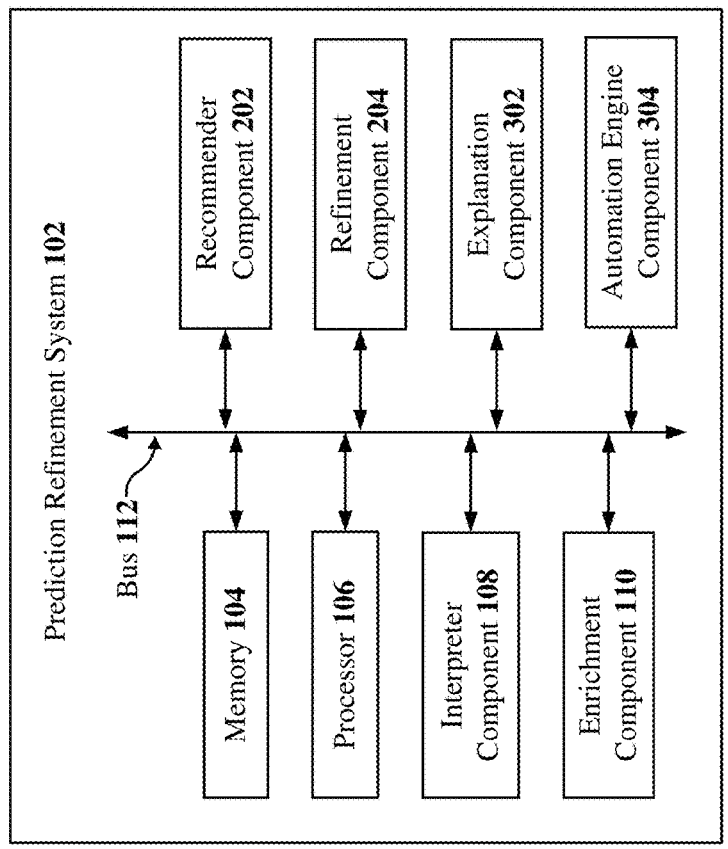
FIG. 3 illustrates a block diagram of an example, non-limiting system that can facilitate refinement of a predicted event based on explainability data in accordance with one or more embodiments described herein.

FIG. 3 illustrates a block diagram of an example, non-limiting system 300 that can facilitate refinement of a predicted event based on explainability data in accordance with one or more embodiments described herein. In some embodiments, system 300 can comprise prediction refinement system 102. In some embodiments, prediction refinement system 102 can comprise an explanation component 302 or an automation engine component 304. Repetitive description of like elements or processes employed in respective embodiments is omitted for sake of brevity.

According to multiple embodiments, explanation component 302 can generate explainability data corresponding to a predicted event. For example, explanation component 302 can generate explainability data corresponding to a predicted event that can be predicted by an artificial intelligence (AI) component or a machine learning component. For instance, an artificial intelligence (AI) component (not illustrated in FIG. 3), which can comprise an artificial intelligence (AI) model (e.g., a classification model, a probabilistic model, statistical-based model, an inference-based model, a deep learning model, a neural network, fuzzy logic, expert system, Bayesian model, etc.), can generate such a predicted event by employing one or more AI algorithms (e.g., utilizing statistical models such as, for instance, Random Forest) or deep learning (e.g., long short time memory (LSTM), convolutional neural network, etc.) over performance monitoring data together with historic outages or anomalies data, etc.). In this example, such an artificial intelligence (AI) component can be trained (e.g., via explicit learning or implicit learning) to generate such a predicted event based on, for instance, time series data, event types, correlating events, diagnostics data, domain data, or other data.

In some embodiments, explanation component 302 can generate explainability data corresponding to an event predicted by such an artificial intelligence (AI) component described above by, for example, identifying key elements that contributed to the artificial intelligence (AI) component generating the predicted event. For example, explanation component 302 can analyze the one or more AI algorithms employed by the artificial intelligence (AI) component described above or data input to such algorithms to identify, for instance, the features contributing to the predicted event, weights of the features contributing to the predicted event, timing of the predicted event, or other key elements that contributed to the artificial intelligence (AI) component generating such a predicted event.

According to multiple embodiments, automation engine component 304 can evaluate accuracy of a predicted event based on explainability data or supplemental data. For example, automation engine component 304 can evaluate accuracy of an event predicted by the artificial intelligence (AI) component described above or the explainability data described above that can be generated by explanation component 302. For instance, automation engine component 304 can evaluate accuracy of a predicted event based on explainability data including, but not limited to, probability of the predicted event (e.g., probability of occurrence), a feature contributing to the predicted event (a feature), a weight of the feature contributing to the predicted event (a feature weight), timing of the predicted event, or other explainability data that can be generated by explanation component 302.

In some embodiments, automation engine component 304 can evaluate accuracy of a predicted event based on supplemental data. For example, automation engine component 304 can evaluate accuracy of a predicted event based on supplemental data including, but not limited to, an event type (e.g., CPU outage, etc.) corresponding to explainability data, correlated events corresponding to explainability data (e.g., an increase in CPU usage and CPU outage), diagnostics data (e.g., performance data, metrics, etc.), or domain data (e.g., time series data, etc.).

In some embodiments, automation engine component 304 can evaluate accuracy of a predicted event based on such supplemental data by employing interpreter component 108, enrichment component 110, or recommender component 202. For example, automation engine component 304 can employ interpreter component 108 to identify (e.g., as described above with reference to FIG. 1) one or more probable causes of an event predicted by the artificial intelligence (AI) component described above based on explainability data generated by explanation component 302 as described above. In this example, automation engine component 304 can employ enrichment component 110 to identify or execute (e.g., as described above with reference to FIG. 1) one or more diagnostic analyses that can be executed on an endpoint device based on the one or more probable causes of a predicted event that can be identified by interpreter component 108. In this example, automation engine component 304 can employ recommender component 202 to validate (e.g., as described above with reference to FIG. 2) the event predicted by the artificial intelligence (AI) component based on the supplemental data obtained by interpreter component 108 or enrichment component 110 (e.g., event types, correlating events, diagnostics data, domain data, etc.).

In the example above, the collective operations of interpreter component 108, enrichment component 110, or recommender component 202 can constitute evaluating the accuracy of the event predicted by the artificial intelligence (AI) component or enriching the predicted event or the explainability data corresponding to the event based on the supplemental data described above. In the example above, by employing interpreter component 108, enrichment component 110, or recommender component 202 to execute the operations described above, automation engine component 304 can thereby automate the collective operations of such components to evaluate accuracy of the predicted event based on the explainability data or the supplemental data. Additionally, or alternatively, in the example above, by employing interpreter component 108, enrichment component 110, or recommender component 202 to execute the operations described above, automation engine component 304 can thereby automate the collective operations of such components to enrich the predicted event (e.g., the predicted event data) or the explainability data based on the supplemental data, where the supplemental data can constitute the enriching data.

In some embodiments, automation engine component 304 can refine a predicted event based on supplemental data. For example, automation engine component 304 can refine the event predicted by the artificial intelligence (AI) component as described above based on the supplemental data obtained by employing interpreter component 108 or enrichment component 110 as described above. In some embodiments, to facilitate such refining of a predicted event based on supplemental data, automation engine component 304 can employ refinement component 204 to refine such a predicted event based on supplemental data. For example, automation engine component 304 can employ refinement component 204 to refine the event predicted by the artificial intelligence (AI) component as described above based on supplemental data obtained by employing interpreter component 108 or enrichment component 110 as described above. For instance, based on such supplemental data, refinement component 204 can determine there is a low probability of the predicted event occurring and thereafter refine the predicted event by reducing the probability of occurrence associated with the predicted event.

Figure 4:
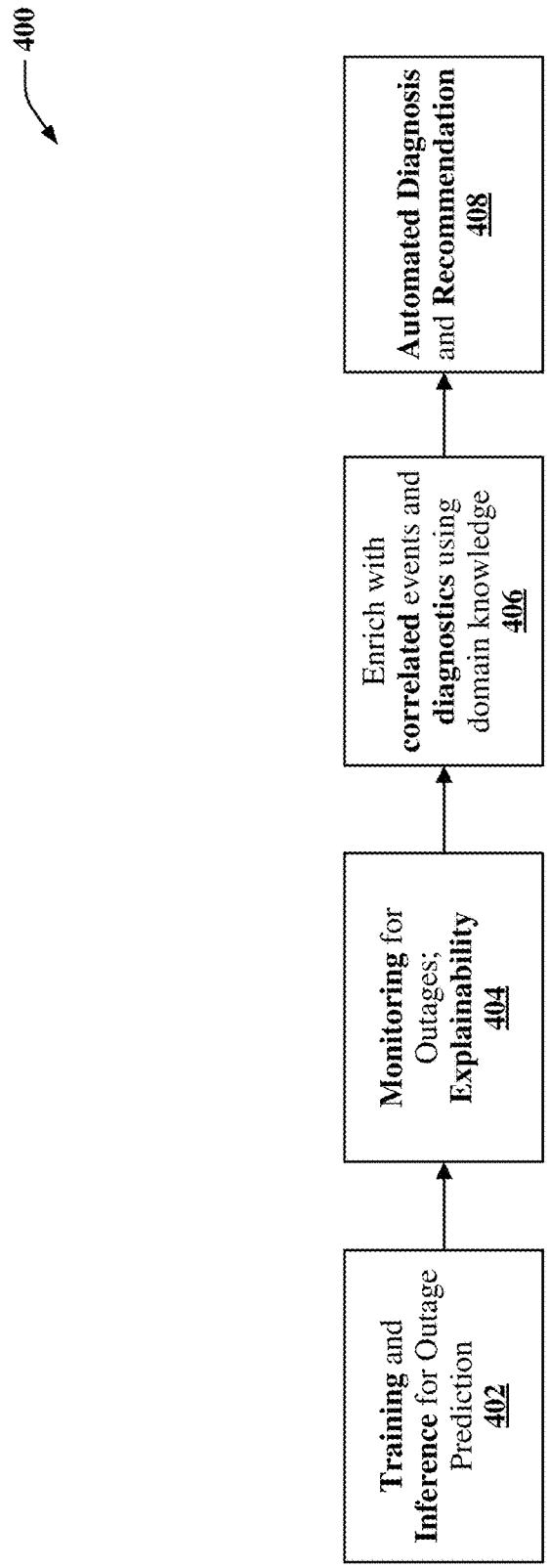
FIG. 4 illustrates a flow diagram of an example, non-limiting computer-implemented method that can facilitate refinement of a predicted event based on explainability data in accordance with one or more embodiments described herein.

FIG. 4 illustrates a flow diagram of an example, non-limiting computer-implemented method 400 that can facilitate refinement of a predicted event based on explainability data in accordance with one or more embodiments described herein. Repetitive description of like elements or processes employed in respective embodiments is omitted for sake of brevity.

In some embodiments, prediction refinement system 102 can comprise an artificial intelligence (AI) component, which can comprise an artificial intelligence (AI) model (e.g., a classification model, a probabilistic model, statistical-based model, an inference-based model, a deep learning model, a neural network, fuzzy logic, expert system, Bayesian model, etc.). At 402, such an artificial intelligence (AI) component can be trained (e.g., via explicit learning or implicit learning) to predict or infer an outage event (e.g., a server outage) based on, for example, time series data, historical outage event data, or other data. At 404, such an artificial intelligence (AI) component can monitor a network (e.g., the Internet, an intranet network, a database, etc.) for an outage event, predict such an outage event, or generate explainability data corresponding to such a predicted outage event. At 406, prediction refinement system 102 (e.g., via interpreter component 108, enrichment component 110, recommender component 202, refinement component 204, explanation component 302, or automation engine component 304) can facilitate enriching such a predicted outage event of operation 404 with correlated events and diagnostics (e.g., diagnostics data) using domain knowledge (e.g., domain data) as described above with reference to FIGS. 1, 2, and 3. At 408, prediction refinement system 102 (e.g., via automation engine component 304) can facilitate automating diagnosis (e.g., of an endpoint device) and recommendation (e.g., of a remediation action) as described above with reference to FIGS. 1, 2, and 3.

Figure 5:
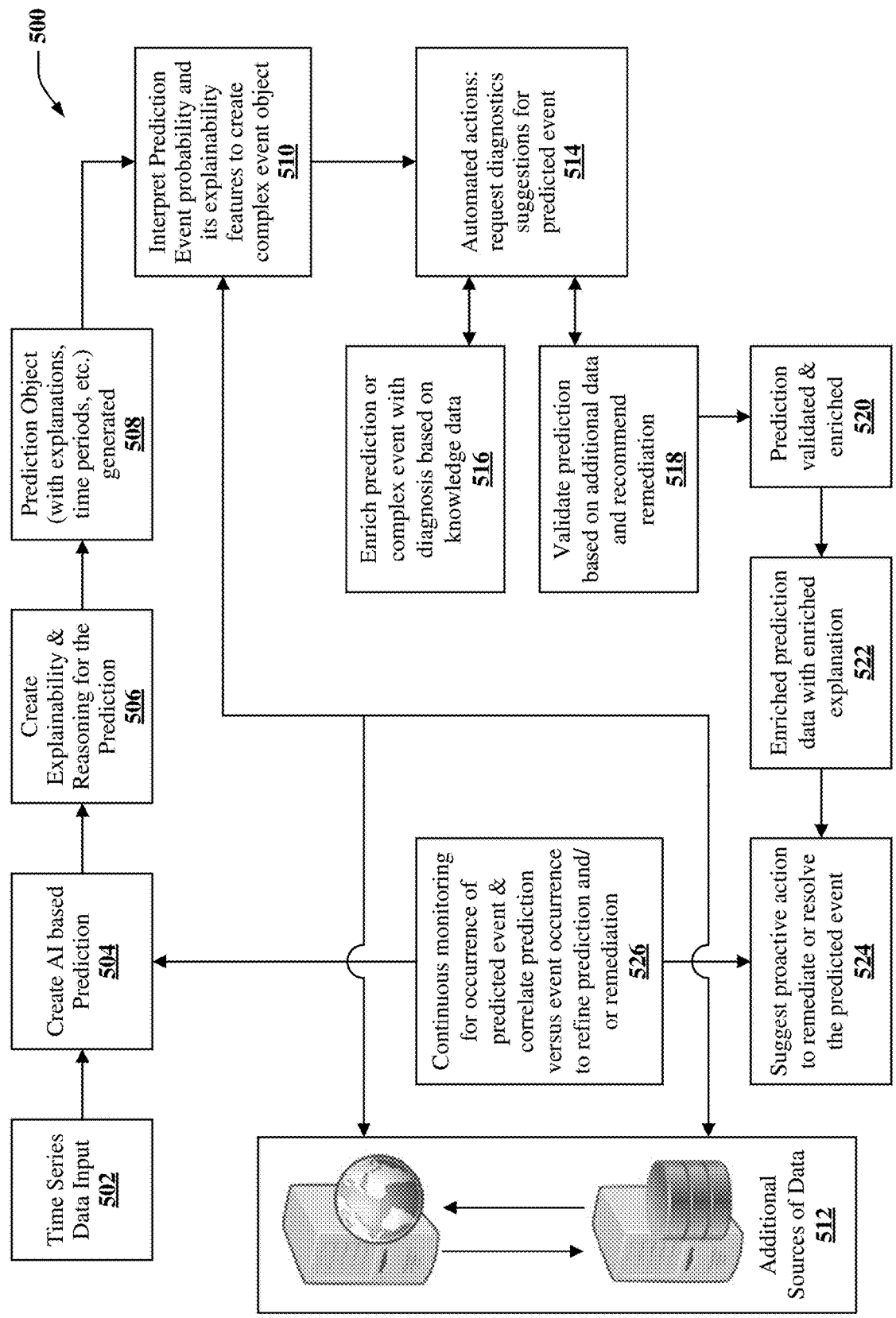
FIG. 5 illustrates a flow diagram of an example, non-limiting computer-implemented method that can facilitate refinement of a predicted event based on explainability data in accordance with one or more embodiments described herein.

FIG. 5 illustrates a flow diagram of an example, non-limiting computer-implemented method 500 that can facilitate refinement of a predicted event based on explainability data in accordance with one or more embodiments described herein. In some embodiments, computer-implemented method 500 can comprise a series of calls or functions that can be executed as described below by prediction refinement system 102 or components thereof. Repetitive description of like elements or processes employed in respective embodiments is omitted for sake of brevity.

At 502, prediction refinement system 102 can receive time series data input. At 504, prediction refinement system 102 (e.g., via an artificial intelligence (AI) component) can create an AI based prediction (e.g., a server outage prediction based on one or more AI algorithms described above with reference to FIG. 3).

At 506, prediction refinement system 102 (e.g., via explanation component 302) can create explainability and reasoning for the prediction of operation 504 (e.g., explainability data defined above with reference to FIG. 1). At 508, a prediction object (e.g., comprising explanations, time periods, etc.) can be generated by prediction refinement system 102 (e.g., via explanation component 302) and transmitted (e.g., via bus 112, the Internet, etc.) to interpreter component 108.

At 510, prediction refinement system 102 (e.g., via interpreter component 108) can interpret prediction event probability and its explainability features to create (e.g., via interpreter component 108) a complex event object (e.g., comprising event types, correlating events, etc.). At 512, to facilitate interpreting the prediction event probability and its explainability features and creating such a complex event object of operation 510, prediction refinement system 102 or interpreter component 108 can access (e.g., a wired network, a wireless network, etc.) one or more additional sources of data (e.g., the Internet, a cloud computing environment, an intranet network, a database, etc.). Continuing with 510, prediction refinement system 102 or interpreter component 108 can transmit (e.g., via bus 112, the Internet, etc.) the complex event object to automation engine component 304, requesting verification or triage.

At 514, prediction refinement system 102 (e.g., via automation engine component 304) can facilitate execution of automated actions (e.g., operation 516 and operation 518 described below) and request diagnostics suggestions (e.g., from enrichment component 110) for the predicted event. At 516, prediction refinement system 102 (e.g., via enrichment component 110 or automation engine component 304) can enrich prediction or complex event with diagnosis (e.g., diagnostics data) based on knowledge data (e.g., domain data). At 518, prediction refinement system 102 (e.g., via recommender component 202) can validate prediction based on additional data and recommend remediation (e.g., remediation action to remediate or resold the predicted event).

At 520, prediction can be validated and enriched by prediction refinement system 102 (e.g., via interpreter component 108, enrichment component 110, or recommender component 202). At 522, enriched prediction data with enriched explanation (e.g., enriched explainability data) can be communicated (e.g., via bus 112, the Internet, etc.) to a resolver component of prediction refinement system 102 (resolver component not illustrated in the figures). At 524, prediction refinement system 102 (e.g., via a resolver component) can suggest proactive action to remediate or resolve the predicted event. Continuing with 524, prediction refinement system 102 (e.g., via a resolver component) can further execute such proactive action to remediate or resolve the predicted event. At 526, prediction refinement system 102 (e.g., via refinement component 204 or an artificial intelligence (AI) component) can facilitate continuous monitoring (e.g., of a network such as, for instance, the Internet, an intranet network, a database, etc.) for occurrence of predicted event and correlate prediction versus event occurrence to refine prediction or remediation. Continuing with 526, prediction refinement system 102 (e.g., via refinement component 204 or an artificial intelligence (AI) component) can transmit (e.g., via bus 112, the Internet, etc.) the correlated prediction versus event occurrence data to an artificial intelligence (AI) component, where such an artificial intelligence (AI) component can create AI based prediction at 504 based on the correlated prediction versus event occurrence data.

Figure 6:
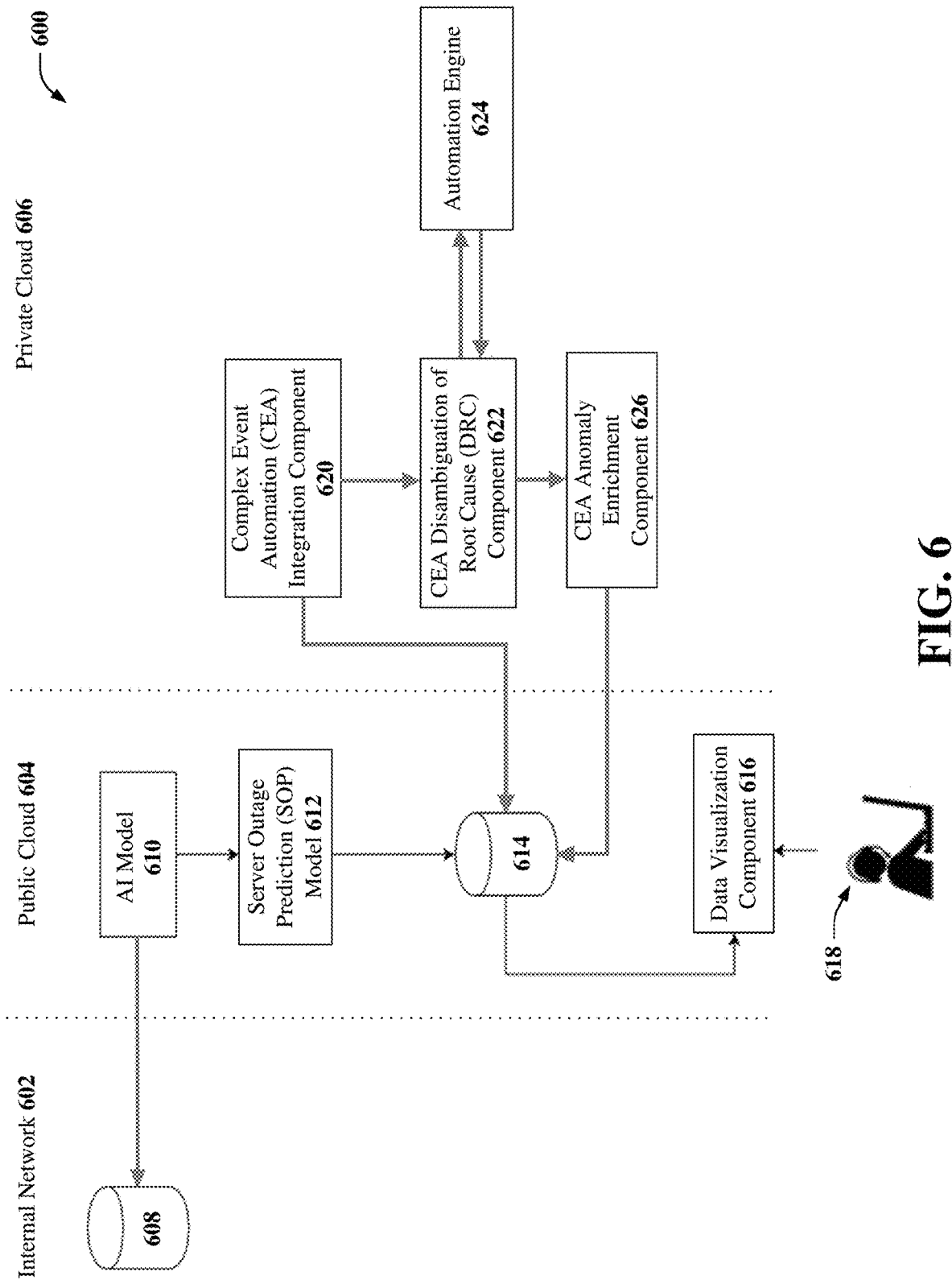
FIG. 6 illustrates a block diagram of an example, non-limiting system that can facilitate refinement of a predicted event based on explainability data in accordance with one or more embodiments described herein.

FIG. 6 illustrates a block diagram of an example, non-limiting system 600 that can facilitate refinement of a predicted event based on explainability data in accordance with one or more embodiments described herein. Repetitive description of like elements or processes employed in respective embodiments is omitted for sake of brevity.

In some embodiments, system 600 can comprise an example embodiment of prediction refinement system 102 implemented in an internal network 602, a public cloud 604, or a private cloud 606. In some embodiments, internal network 602 can comprise a capacity tool historical data component 608, which can comprise a database that can store historical data (e.g., time series data). In some embodiments, public cloud 604 can comprise an AI model 610, a server outage prediction (SOP) model 612, a search engine 614, or a data visualization component 616 (e.g., a graphical user interface (GUI)), which an entity 618 (e.g., a human user) can utilize to interface with or operate system 600 or prediction refinement system 102. In some embodiments, private cloud 606 can comprise a complex event automation (CEA) integration component 620, a CEA disambiguation of root cause (DRC) component 622, an automation engine 624, or a CEA anomaly enrichment component 626.

In some embodiments, AI model 610 can comprise an artificial intelligence model (e.g., a classification model, a probabilistic model, statistical-based model, an inference-based model, a deep learning model, a neural network, fuzzy logic, expert system, Bayesian model, etc.) that can retrieve data (e.g., historical data, time series data, etc.) from capacity tool historical data component 608 and run such data through server outage prediction (SOP) model 612. In some embodiments, server outage prediction (SOP) model 612 can comprise a machine learning model or an artificial intelligence model (e.g., a classification model, a probabilistic model, statistical-based model, an inference-based model, a deep learning model, a neural network, fuzzy logic, expert system, Bayesian model, etc.) that can predict a server outage event and transmit such prediction data to search engine 614.

In some embodiments, complex event automation (CEA) integration component 620 or CEA disambiguation of root cause (DRC) component 622 can comprise interpreter component 108 described above with reference to FIG. 1. In some embodiments, complex event automation (CEA) integration component 620 can query search engine 614 for data based on a defined time interval (e.g., every 10 seconds). In some embodiments, complex event automation (CEA) integration component 620 can further request anomaly enrichment from CEA disambiguation of root cause (DRC) component 622. For example, complex event automation (CEA) integration component 620 can request anomaly enrichment such as, for instance, enrichment of a server outage prediction.

In some embodiments, automation engine 624 can comprise enrichment component 110, recommender component 202, or automation engine component 304 described above with reference to FIGS. 1, 2, and 3. In some embodiments, CEA disambiguation of root cause (DRC) component 622 can request endpoint data from automation engine 624. For example, CEA disambiguation of root cause (DRC) component 622 can request endpoint data including, but not limited to, one or more suggested diagnostic analyses that can be executed on an endpoint device (e.g., a server, a CPU, etc.), diagnostics data resulting from executing such suggested one or more diagnostic analyses on the endpoint device, or other endpoint data. In some embodiments, automation engine 624 can provide such endpoint data to CEA disambiguation of root cause (DRC) component 622. In some embodiments, CEA anomaly enrichment component 626 can comprise recommender component 202 described above with reference to FIG. 2. In some embodiments, CEA anomaly enrichment component 626 can transmit anomaly enrichment data to search engine 614. For example, CEA anomaly enrichment component 626 can send anomaly enrichment data to automation engine 624 index "cea_anomaly_enrichment."

In some embodiments, search engine 614 can provide anomaly data or anomaly enrichment data to data visualization component 616. For example, search engine 614 can provide server outage prediction data (e.g., explainability data or predicted event details such as, for instance, server identification data, predicted outage time, etc.) or enrichment data corresponding to the server outage prediction (e.g., event types, correlating events, diagnostics data, domain data, etc.). In some embodiments, data visualization component 616 can comprise a graphical user interface (GUI) that can facilitate visual presentation of anomaly data or anomaly enrichment data to entity 618. For example, data visualization component 616 can comprise a dynamic dashboard of server outage prediction data (e.g., explainability data or predicted event details such as, for instance, server identification data, predicted outage time, etc.) or enrichment data corresponding to the server outage prediction (e.g., event types, correlating events, diagnostics data, domain data, etc.).

Figure 7A:
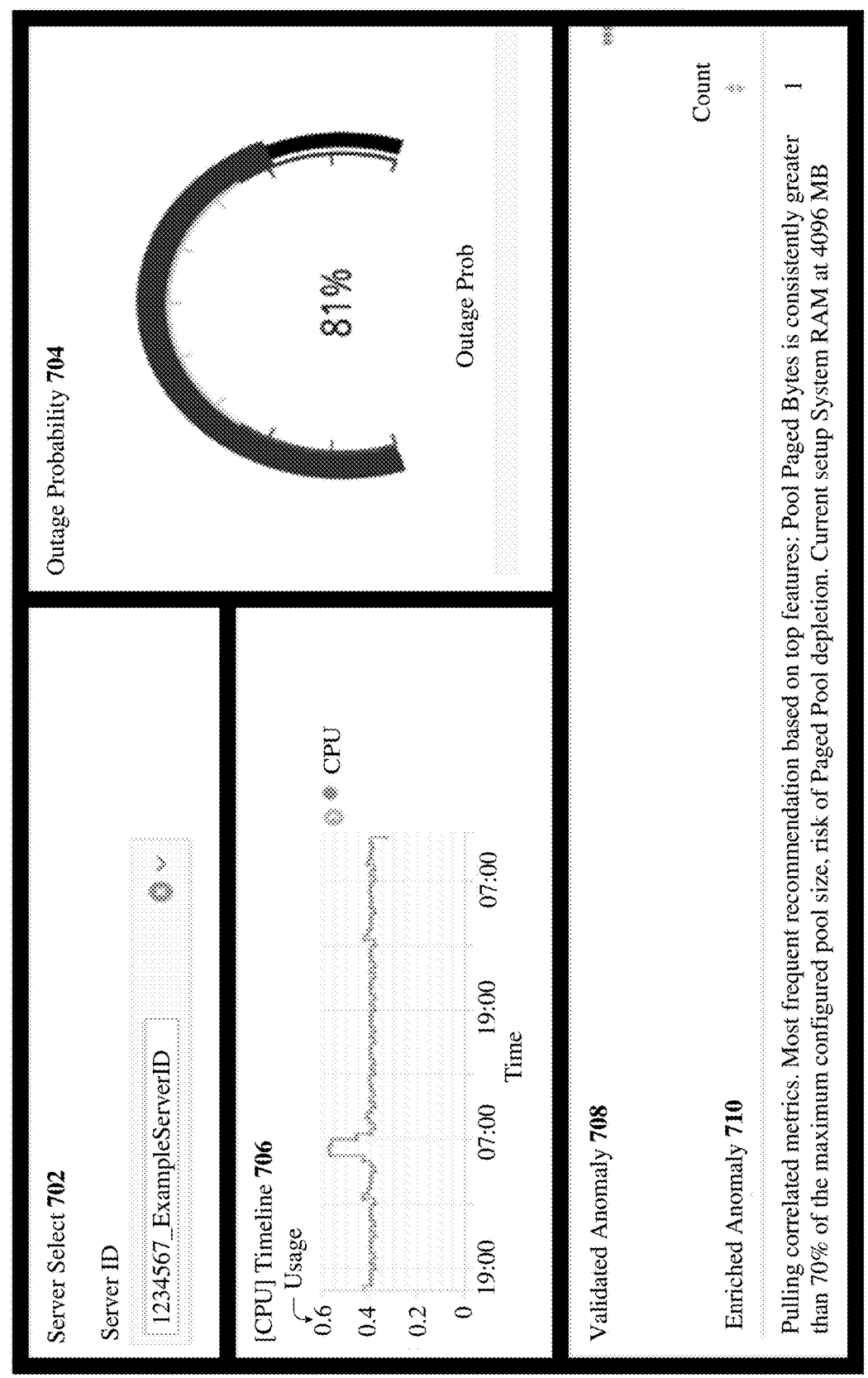
FIGS. 7A and 7B illustrate example, non-limiting information that can facilitate refinement of a predicted event based on explainability data in accordance with one or more embodiments described herein.
Figure 7B:
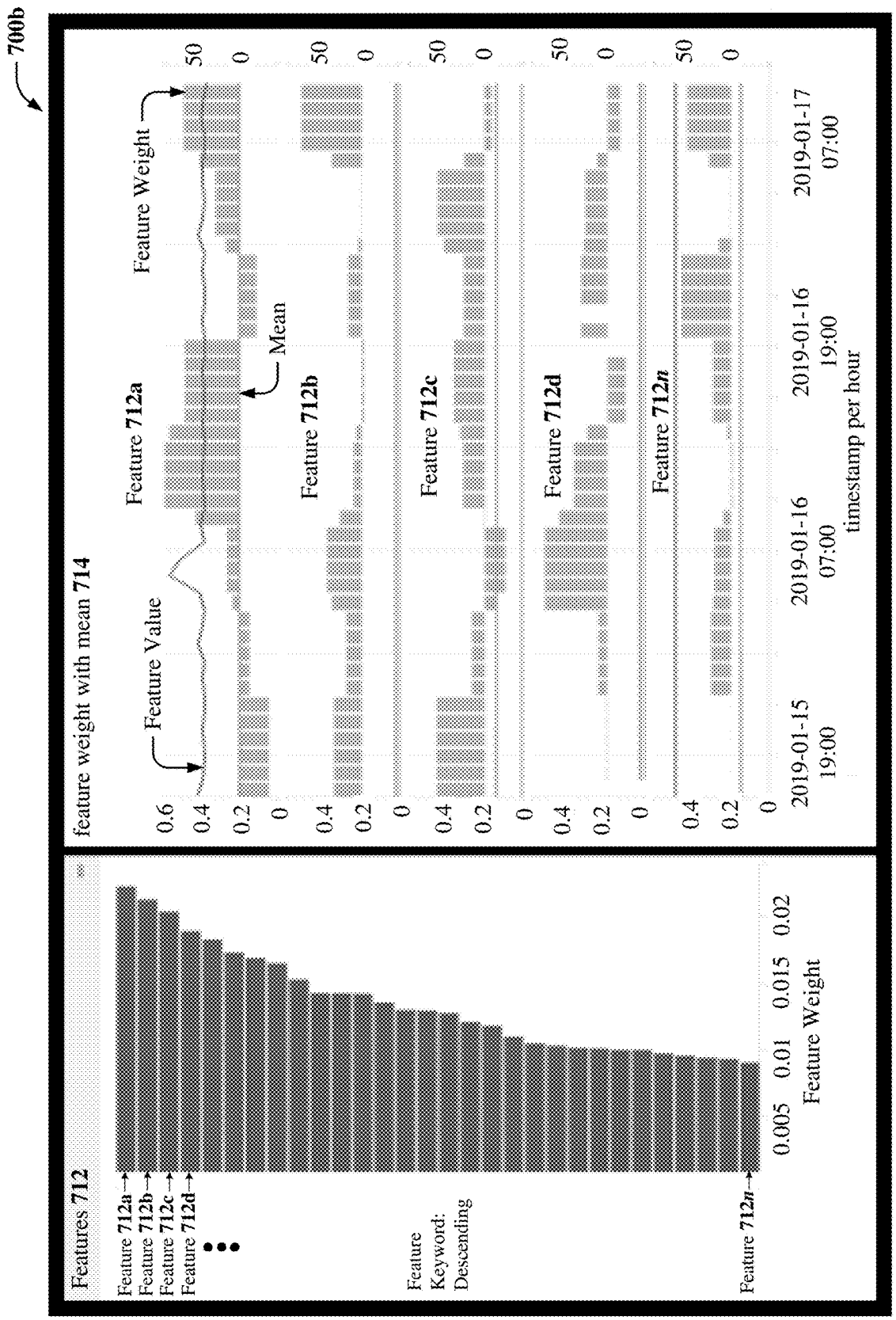

FIGS. 7A and 7B illustrate example, non-limiting information 700a, 700b that can facilitate refinement of a predicted event based on explainability data in accordance with one or more embodiments described herein. In some embodiments, information 700a, 700b can comprise example embodiments of data visualization component 616 implemented by prediction refinement system 102. Repetitive description of like elements or processes employed in respective embodiments is omitted for sake of brevity.

In some embodiments, information 700a (FIG. 7A) can comprise a server select 702 section that can facilitate selection of (e.g., by entity 618) or visual presentation of server identification (server ID). In some embodiments, information 700a can comprise an outage probability 704 section that can comprise outage probability data (e.g., confidence level of an outage) that can be represented as a percentage (e.g., ranging from 0% to 100%) or as a gage. In some embodiments, information 700a can comprise [CPU] timeline 706 section that can comprise time series data corresponding to a feature (e.g., a selected feature) such as, for example, CPU usage, where such CPU usage (y-axis) can be plotted against time (x-axis). In some embodiments, information 700a can comprise a validated anomaly 708 section that can comprise anomaly validation data indicative of whether an anomaly (e.g., CPU outage) has been validated. In some embodiments, information 700a can comprise an enriched anomaly 710 section that can comprise a textual presentation of anomaly explainability data or anomaly enrichment data (e.g., event types, correlating events, suggested diagnostic analysis, diagnostics data, domain data, recommended remediation actions to remediate or resolve an anomaly, anomaly refinement data, etc.) that can be provided by interpreter component 108, enrichment component 110, recommender component 202, refinement component 204, explanation component 302, or automation engine component 304 (e.g., as described above with reference to FIGS. 1, 2, and 3).

In some embodiments, information 700b (FIG. 7B) can comprise one or more sections that can provide visual presentation of enrichment data indicative of feature importance. In some embodiments, information 700b can comprise a features 712 section that can comprise a list of most significant features 712a, 712b, 712c, 712d, 712n (where n represents total quantity of most significant features 712) contributing to a positive prediction (e.g., contributing to validation of a predicted event). For example, features 712 section can comprise most significant features 712*a*, 712*b*, 712*c*, 712*d*, 712*n* listed in descending order according to feature weight corresponding to each feature. In some embodiments, features 712 section can comprise most significant features 712*a*, 712*b*, 712*c*, 712*d*, 712*n* including, but not limited to, cpu_stddev_unix, pages_sec, mem_stddev_win, out_packets_avg, disk_kb_read_avg, or other most significant features.

In some embodiments, information 700*b* can comprise a feature weight with mean 714 section that can comprise time series visualizations of historical data corresponding to each of the most significant features 712*a*, 712*b*, 712*c*, 712*d*, 712*n*. For example, such time series visualizations of historical data corresponding to each of the most significant features 712*a*, 712*b*, 712*c*, 712*d*, 712*n* can comprise feature value (left side y-axis), feature weight (right side y-axis), or a mean value (e.g., of negative set) plotted against hourly timestamp data. In some embodiments, such time series visualizations of historical data corresponding to each of the most significant features 712*a*, 712*b*, 712*c*, 712*d*, 712*n* can facilitate anomaly identification.

In some embodiments, prediction refinement system 102 can be a prediction event refinement system or process associated with various technologies. For example, prediction refinement system 102 can be associated with machine learning technologies, artificial intelligence technologies, network monitoring or optimization technologies, network or resource diagnostics technologies, data analytics technologies, cloud computing technologies, computer technologies, server technologies, information technology (IT) technologies, internet-of-things (IoT) technologies, automation technologies, data exchange technologies, or other technologies.

In some embodiments, prediction refinement system 102 can provide technical improvements to systems, devices, components, operational steps, or processing steps associated with the various technologies identified above. For example, prediction refinement system 102 can automatically (e.g., without action by a human user) identify a probable cause of a predicted event based on explainability data corresponding to the predicted event or execute a diagnostic analysis based on the probable cause, thereby enriching the explainability data based on diagnostics data determined by executing the diagnostic analysis. In another example, prediction refinement system 102 can automatically (e.g., without action by a human user) evaluate the accuracy of the predicted event (e.g., validate the prediction) or recommend a remediation action to remediate or resolve the predicted event.

In some embodiments, prediction refinement system 102 can provide technical improvements to a processing unit (e.g., processor 106, a CPU, etc.) associated with one or more of the various technologies identified above. For example, as described above, by automatically (e.g., without action by a human user) validating a prediction event or recommending a remediation action to remediate or resolve the predicted event, prediction refinement system 102 can facilitate improving processing performance of such a processing unit (e.g., processor 106, a CPU etc.). For instance, by recommending such a remediation action that can be implemented to avoid occurrence of predicted events that can have negative impacts on a network or a computing device (e.g., a server outage, CPU outage, etc.), prediction refinement system 102 can facilitate preventing undesired or unplanned interruption (e.g., downtime, offline time) of such a network or computing device.

In some embodiments, prediction refinement system 102 can employ hardware or software to solve problems that are highly technical in nature, that are not abstract and that cannot be performed as a set of mental acts by a human In some embodiments, some of the processes described herein may be performed by one or more specialized computers (e.g., one or more specialized processing units, a specialized computer with automated diagnostics or optimization component(s), etc.) for carrying out defined tasks related to the various technologies identified above. In some embodiments, prediction refinement system 102 or components thereof, can be employed to solve new problems that arise through advancements in technologies mentioned above, employment of cloud-computing systems, computer architecture, or another technology.

It is to be appreciated that prediction refinement system 102 can perform a predicted event refinement process utilizing various combinations of electrical components, mechanical components, and circuitry that cannot be replicated in the mind of a human or performed by a human, as the various operations that can be executed by prediction refinement system 102 or components thereof as described herein are operations that are greater than the capability of a human mind. For instance, the amount of data processed, the speed of processing such data, or the types of data processed by prediction refinement system 102 over a certain period of time can be greater, faster, or different than the amount, speed, or data type that can be processed by a human mind over the same period of time.

According to several embodiments, prediction refinement system 102 can also be fully operational towards performing one or more other functions (e.g., fully powered on, fully executed, etc.) while also performing the above-referenced predicted event refinement process. It should be appreciated that such simultaneous multi-operational execution is beyond the capability of a human mind. It should also be appreciated that prediction refinement system 102 can include information that is impossible to obtain manually by an entity, such as a human user. For example, the type, amount, or variety of information included in interpreter component 108, enrichment component 110, recommender component 202, refinement component 204, explanation component 302, or automation engine component 304 can be more complex than information obtained manually by a human user.

Figure 8:
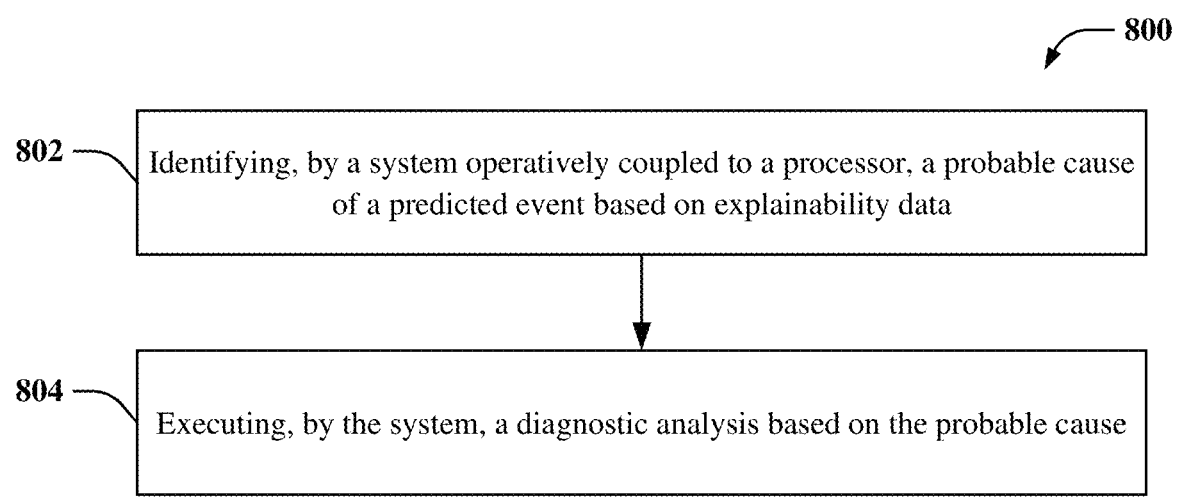
FIG. 8 illustrates a flow diagram of an example, non-limiting computer-implemented method that can facilitate refinement of a predicted event based on explainability data in accordance with one or more embodiments described herein.

FIG. 8 illustrates a flow diagram of an example, non-limiting computer-implemented method 800 that can facilitate refinement of a predicted event based on explainability data in accordance with one or more embodiments described herein. Repetitive description of like elements or processes employed in respective embodiments is omitted for sake of brevity.

At 802, identifying, by a system (e.g., via prediction refinement system 102 or interpreter component 108) operatively coupled to a processor (e.g., processor 106), a probable cause (e.g., an event type corresponding to explainability data, correlating events corresponding to explainability data, etc.) of a predicted event (e.g., a server outage) based on explainability data. In some embodiments, such explainability data can include, but is not limited to, probability of the predicted event (e.g., probability of occurrence), a feature contributing to the predicted event (also referred to herein as a feature), a weight of the feature contributing to the predicted event (also referred to herein as a feature weight), timing of the predicted event) or other explainability data.

At 804, executing, by the system (e.g., via prediction refinement system 102 or enrichment component 110), a diagnostic analysis based on the probable cause. In some embodiments, such a diagnostic analysis can include, but is not limited to, system ping, database call, application or workload performance probe, disk space assessment, or another diagnostic analysis.

Figure 9:
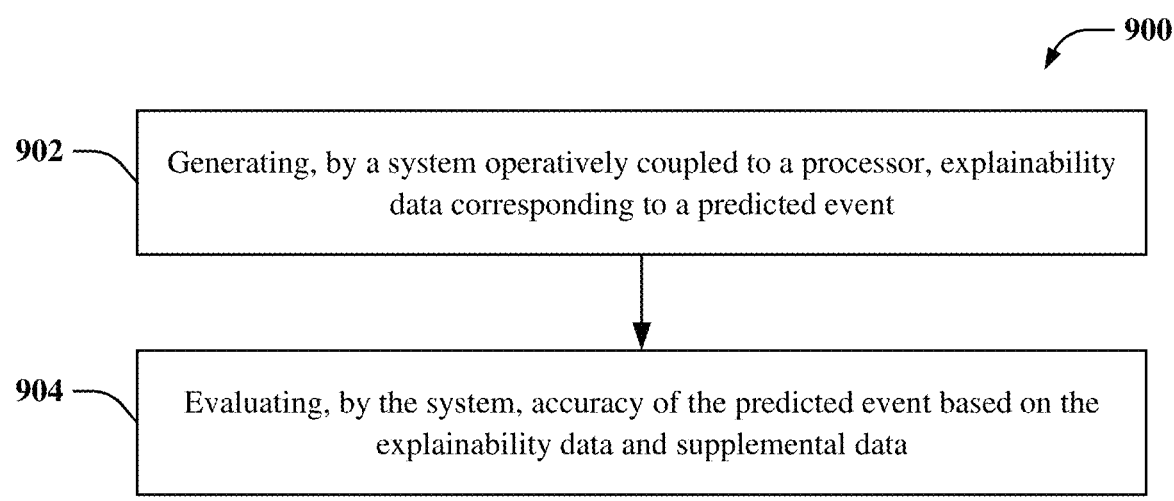
FIG. 9 illustrates a flow diagram of an example, non-limiting computer-implemented method that can facilitate refinement of a predicted event based on explainability data in accordance with one or more embodiments described herein.

FIG. 9 illustrates a flow diagram of an example, non-limiting computer-implemented method 900 that can facilitate refinement of a predicted event based on explainability data in accordance with one or more embodiments described herein. Repetitive description of like elements or processes employed in respective embodiments is omitted for sake of brevity.

At 902, generating, by a system (e.g., via prediction refinement system 102 or explanation component 302) operatively coupled to a processor (e.g., processor 106), explainability data corresponding to a predicted event (e.g., a server outage). In some embodiments, such explainability data can include, but is not limited to, probability of the predicted event (e.g., probability of occurrence), a feature contributing to the predicted event (also referred to herein as a feature), a weight of the feature contributing to the predicted event (also referred to herein as a feature weight), timing of the predicted event) or other explainability data.

At 904, evaluating, by the system (e.g., via prediction refinement system 102 or automation engine component 304), accuracy of the predicted event based on the explainability data and supplemental data. In some embodiments, such supplemental data can include, but is not limited to, event type corresponding to the explainability data, correlated events corresponding to the explainability data, diagnostics data, domain data, or other supplemental data.

For simplicity of explanation, the computer-implemented methodologies are depicted and described as a series of acts. It is to be understood and appreciated that the subject innovation is not limited by the acts illustrated or by the order of acts, for example acts can occur in various orders or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
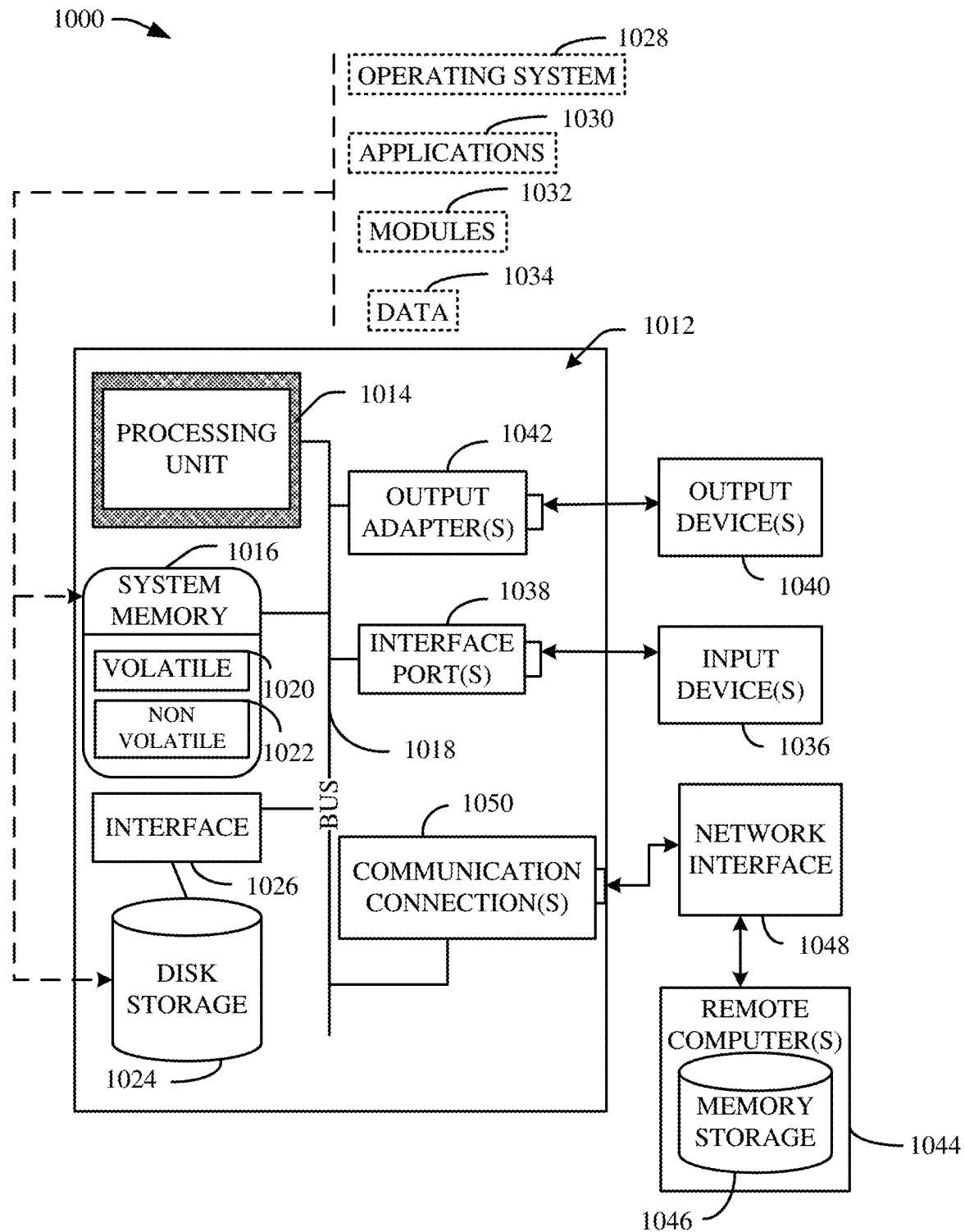
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements or processes employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
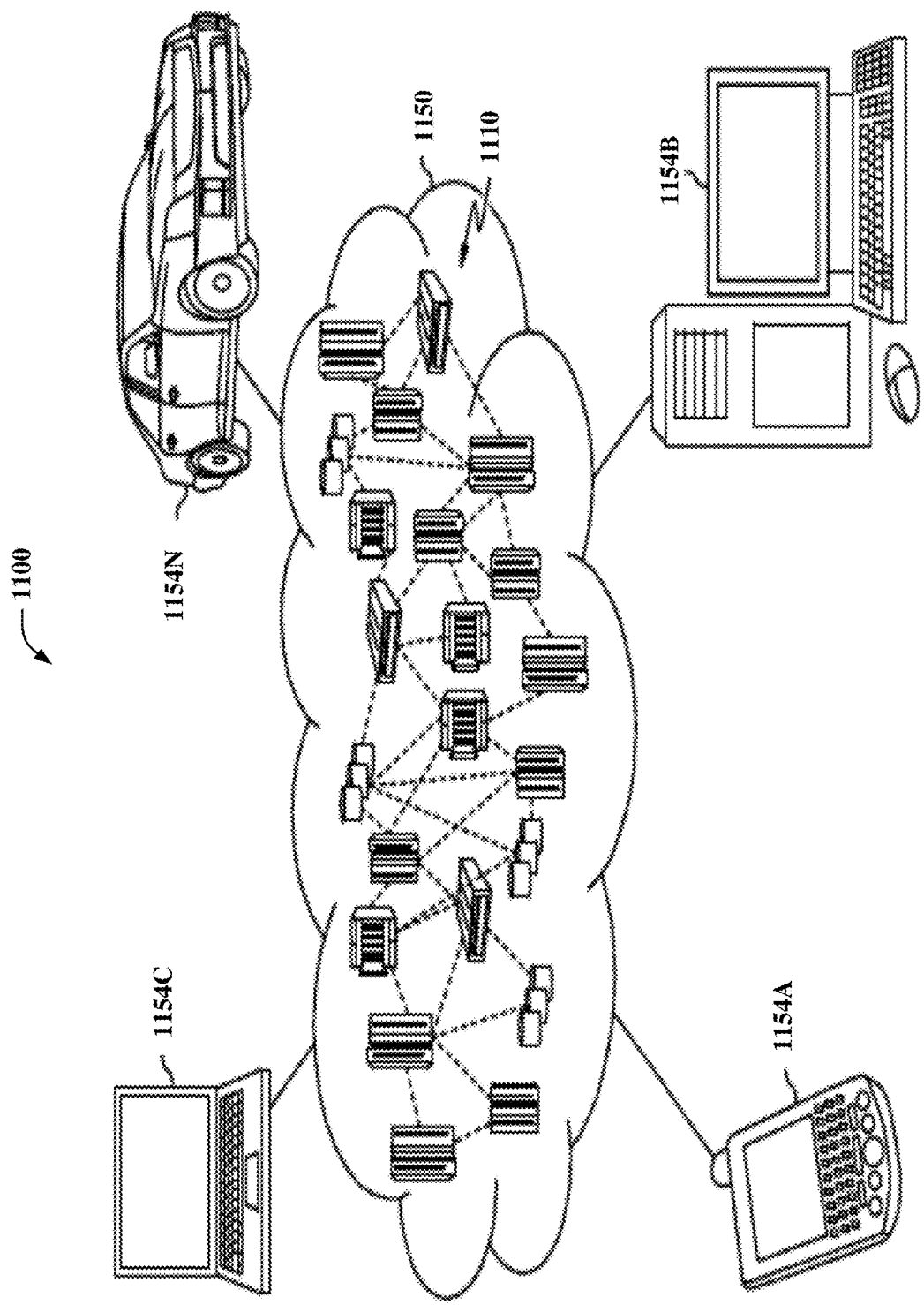
FIG. 11 illustrates a block diagram of an example, non-limiting cloud computing environment in accordance with one or more embodiments of the subject disclosure.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network or network addressable connection (e.g., using a web browser).

Figure 12:
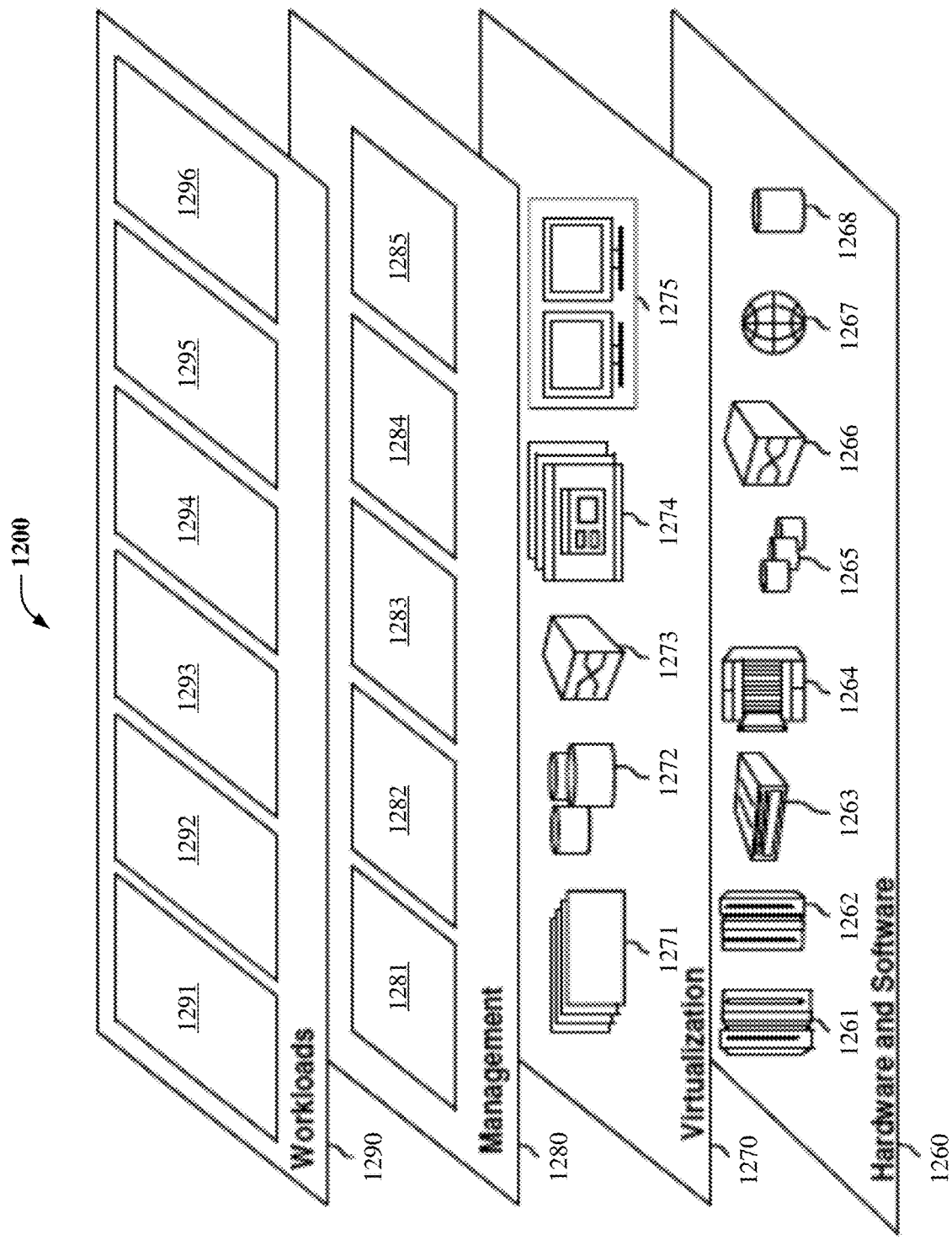
FIG. 12 illustrates a block diagram of example, non-limiting abstraction model layers in accordance with one or more embodiments of the subject disclosure.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and prediction refinement software 1296.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      an interpreter component that identifies a probable cause of a predicted event based on explainability data;
      an enrichment component that executes a diagnostic analysis based on the probable cause; and
      a recommender component that validates the predicted event based on at least one of the diagnostic analysis or domain data.

2. The system of claim 1, wherein the probable cause comprises at least one of an event type corresponding to the explainability data or correlating events corresponding to the explainability data.

3. The system of claim 1, wherein the explainability data comprises at least one of probability of the predicted event, a feature contributing to the predicted event, a weight of the feature contributing to the predicted event, or timing of the predicted event.

4. The system of claim 1, wherein the computer executable components further comprise a recommender component that recommends a remediation action based on at least one of the predicted event, the explainability data, the probable cause, the diagnostic analysis, or domain data, thereby facilitating improved processing performance associated with at least one of the processor or a processing unit associate with the system.

5. The system of claim 1, wherein the computer executable components further comprise a refinement component that refines at least one of the predicted event or a remediation action based on a correlation between the predicted event and occurrence of the predicted event.

6. A computer-implemented method, comprising:
   identifying, by a system operatively coupled to a processor, a probable cause of a predicted event based on explainability data;
   executing, by the system, a diagnostic analysis based on the probable cause; and
   validating, by the system, the predicted event based on at least one of the diagnostic analysis or domain data.

7. The computer-implemented method of claim 6, wherein identifying comprises, identifying, by the system, at least one of an event type corresponding to the explainability data or correlating events corresponding to the explainability data.

8. The computer-implemented method of claim 6, wherein the explainability data comprises at least one of probability of the predicted event, a feature contributing to the predicted event, a weight of the feature contributing to the predicted event, or timing of the predicted event.

9. The computer-implemented method of claim 6, further comprising, recommending, by the system, a remediation action based on at least one of the predicted event, the explainability data, the probable cause, the diagnostic analysis, or domain data, thereby facilitating improved processing performance associated with at least one of the processor or a processing unit associate with the system.

10. The computer-implemented method of claim 6, further comprising, refining, by the system, at least one of the predicted event or a remediation action based on a correlation between the predicted event and occurrence of the predicted event.

11. A computer program product facilitating a predicted event refinement process based on explainability data, the computer program product comprising a computer readable storage medium having program instructions embodied therewith, the program instructions executable by a processor to cause the processor to:
   identify, by the processor, a probable cause of a predicted event based on explainability data;
   execute, by the processor, a diagnostic analysis based on the probable cause; and
   validate, by the processor, the predicted event based on at least one of the diagnostic analysis or domain data.

12. The computer program product of claim 11, wherein the program instructions are further executable by the processor to cause the processor to identify, by the processor, at least one of an event type corresponding to the explainability data or correlating events corresponding to the explainability data.

13. The computer program product of claim 11, wherein the program instructions are further executable by the processor to cause the processor to recommend, by the processor, a remediation action based on at least one of the predicted event, the explainability data, the probable cause, the diagnostic analysis, or domain data.

14. The computer program product of claim 11, wherein the program instructions are further executable by the processor to cause the processor to refine, by the processor, at least one of the predicted event or a remediation action based on a correlation between the predicted event and occurrence of the predicted event.

\* \* \* \* \*